Patented Mar. 25, 1930

1,752,003

UNITED STATES PATENT OFFICE

KAI ALEXANDER JACOBSEN, OF COPENHAGEN, DENMARK, ASSIGNOR, BY MESNE ASSIGNMENTS, TO STANDARD BRANDS INCORPORATED, OF DOVER, DELAWARE, A CORPORATION OF DELAWARE

PROCESS FOR THE MANUFACTURE OF YEAST

No Drawing. Application filed May 28, 1928, Serial No. 281,363, and in Denmark June 8, 1927.

This invention relates to the manufacture of yeast, especially bakers' yeast, and more particularly, to an improved method of carrying out those processes of manufacturing yeast known as "Continuous addition processes", in which at least a part of the yeast-nutrient solution is added slowly during the propagating period.

An object of the invention is to provide an improved procedure for the manufacture of yeast in an efficient, convenient and economical manner whereby the effective capacity of the propagating vats and other propagating apparatus is increased, the efficiency of the assimilation of yeast nutrients raised, and large yields of high quality yeast are obtained.

A more specific object of the invention is to so control the process, particularly as to the addition of nutrients to the propagating liquid during the propagating period, that in the principal fermenter the yeast is continuously maintained in a state of active budding, whereby the nutrients are efficiently used by the yeast in a rational manner to produce maximum yeast reproduction per unit of time.

Other objects of the invention will in part be obvious and will in part appear hereinafter.

The invention accordingly comprises the several steps and the relation and order of one or more of such steps with respect to each of the others thereof, which will be exemplified in the method hereinafter disclosed, and the scope of the application of which will be indicated in the claims.

In recent years the continuous addition processes of manufacturing yeast have largely replaced the older types of batch or straight fermentation processes. As an example of a usual method of carrying out such continuous addition processes, attention is directed to U. S. Letters Patent to Hayduck Nos. 1,449,105 and 1,449,106, issued March 20, 1923, in which a yeast-nutrient solution is prepared in a relatively concentrated form, the seed or stock yeast is suspended in an aqueous liquid, filling a small portion only of the fermenter, and while this suspension is aerated the prepared yeast-nutrient solution is slowly and substantially continuously added thereto in a manner which is substantially equal to the attenuation of the solution and the assimilation of the nutrients by the propagating yeast.

Although the principles of the present invention are applicable with good effect to such processes, they are possibly even more effective in connection with other types of continuous addition processes which are known as Continuous addition—Continuous withdrawal processes, such as are exemplified by U. S. Letters Patent to Hayduck Nos. 1,449,107 and 1,449,108, issued March 20, 1923. In the process disclosed in Letters Patent No. 1,449,107 the propagation is initially carried on substantially as above described, and, when the fermenter has become substantially filled with propagating liquid, yeast-containing liquid is drawn off therefrom at substantially the same rate that the nutrient materials are being added thereto, while in Letters Patent No. 1,449,108 it is pointed out that, when desired, the fermenter can initially be substantially filled with a dilute nutrient solution, seeded with a maximum amount of seed yeast, and the withdrawal can be started substantially simultaneously with the beginning of the addition of nutrients.

As is indicated above, in carrying out any of the continuous addition processes, the addition of nutrients is proportioned to the yeast growth, and, as will be readily understood by one skilled in the art, although it may be varied in accordance with the density of the nutrient solution, the amount of aeration, the amount of residual nutrient solution to be added in a given time, the size of the apparatus, and the amount of seed yeast used, yet as is pointed out in said Letters Patent, the rate of addition is largely determined by maintaining the density of the propagating liquid substantially constant and at a point such that any alcohol which is formed is substantially immediately assimilated by the yeast.

By a careful study of such processes, and by making frequent observations and cell counts under the microscope, I have ascertained that when such processes are carried out as heretofore, the yeast in the fermenter undergoes distinct periods of alternate budding and ripening during the process, and that these periods normally tend to follow each other in intervals of from two to four hours, according to the proportion of the yeast concentration and the quantity of nutrients supplied. Furthermore, during each period of ripening, during which new yeast cells are formed in small quantities only, I have found that the carbohydrates supplied in the nutrient material are utilized in an irrational manner, as is indicated by a reduction of the propagating capacity of the yeast, and the evolution of heat. I have also found that in carrying out the continuous addition-continuous withdrawal processes the continuous withdrawal of the yeast-containing liquid results in a decrease of the yeast concentration in the fermenter during such yeast-ripening periods, and that the subsequent budding period is initiated only when this decrease has continued until the ratio of the carbohydrate material to the yeast content has reached that point at which budding will again occur at a rapid rate. As a consequence, however, of the loss in yeast content, the lag in budding and the continued addition of nutrients during this interval, the yeast content tends to become disproportionate to the total nutrient content of the propagating liquid, and the next ripening cycle tends to occur before a proper balance, judged from the manufacturing standpoint, is again attained, whereby, when the process is extended over a lengthy period of time, varying yeast concentrations occur. Thus the yield of yeast, judged either from the standpoint of efficient utilization of the nutrients, or from the standpoint of yield per unit of time, is not as great as it theoretically should be.

I have found that such undesirable conditions can be substantially entirely eliminated if at the beginning of the decrease in budding rate, and/or during the early stages of the ripening period, an increased quantity of nutrients is added for a short time, whereby the tendency of the yeast to enter into a ripening period is overcome, and the yeast returns again to its active budding state. Thereupon the normal supply of nutrients to the propagating liquid may be resumed until the next period of decrease in budding rate and tendency toward ripening is approached, at which time the operations may be repeated.

As will be readily understood, care must be taken not to add the increased quantity of nutrients in too great an amount or for too long a period, otherwise the density of the propagating liquid may be increased to a point at which the nutrients will tend to be utilized by the yeast in the formation of alcohol rather than in the development of yeast cells. More specifically, I have found that, if the ripening periods in a given process would tend to occur at three-hour intervals, the ripening period will be prevented and the yeast will be maintained in an active budding condition by increasing the addition of nutrients at this time. This addition may comprise from 20% to 50% or more over that normally added during a given period, and may be made in a single charge or distributed over a period of from one-half to 1½ hours. By this the nutrient materials will be utilized rationally in the formation of new cells, and the quantity of the yeast in the fermenter and the ratio thereof to the carbohydrate materials will be maintained substantially constant throughout the duration of the process.

Since, when the principles of the present invention are applied to continuous addition processes, such as, for example, to the above-mentioned processes, the propagating yeast is substantially continuously maintained in a budding state, it is necessary that the propagating period thus controlled must be followed up by a maturing period before the yeast can be separated, pressed and packaged for the market. Otherwise, the yeast so produced would have but poor keeping qualities and would otherwise be unsuitable for commercial distribution and use. In the processes exemplified by Letters Patent Nos. 1,449,105 and 1,449,106, this maturation may be accomplished by continuing the aeration of the propagating liquid for a short period after the continuous addition has terminated, whereupon the yeast can be separated, pressed and packaged in the usual manner. In the processes exemplified by Letters Patent Nos. 1,449,107 and 1,449,108, in which a continuous withdrawal is practiced, such maturation can be readily accomplished by leading the liquid withdrawn from the main fermenter into an auxiliary fermenter, which is also aerated, and after a sufficient amount of propagating liquid has collected therein the yeast-containing liquid can, similarly, be continuously withdrawn therefrom and led directly to the separators. A sufficient period of time for allowing any given portion of yeast-containing liquid to remain in the auxiliary fermenter is about two hours, and it is preferable to add to the propagating liquid in the auxiliary fermenter during this period a slight additional supply of nutrient solution, thereby improving the degree of uniformity of maturation and, hence, uniform baking and keeping qualities.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A method of manufacturing yeast by the aeration method, which comprises initiating propagation of yeast in a dilute nutrient solution with aeration, substantially continuously adding thereto a more concentrated nutrient solution, and at about the beginning of each cessation of budding increasing the addition of nutrients until the yeast is again actively budding.

2. A method of manufacturing yeast by the aeration method, which comprises initiating propagation of yeast in a dilute nutrient solution with aeration, substantially continuously adding thereto a more concentrated nutrient solution, at about the beginning of each cessation of budding increasing the addition of nutrients until the yeast is again actively budding, and thereafter reverting to the normal rate of addition of nutrients.

3. An improved method of carrying out an addition process of manufacturing yeast, which comprises preparing a relatively concentrated yeast-nutrient solution, initiating the propagation of yeast in a dilute nutrient solution in a fermenter, aerating the propagating liquid, and adding thereto the relatively concentrated nutrient solution in a manner such that the density of the propagating liquid remains approximately constant; and during the period of propagation maintaining the yeast in the fermenter in an actively budding condition by increasing the addition of nutrients thereto at approximately the cessation of the budding period and the beginning of the ripening period; said increased addition being continued until the yeast again commences actively to bud.

4. An improved method of carrying out an addition process of manufacturing yeast, which comprises preparing a relatively concentrated yeast-nutrient solution, initiating the propagation of yeast in a dilute nutrient solution in a fermenter, aerating the propagating liquid, and adding thereto the relatively concentrated nutrient solution in a manner such that the density of the propagating liquid remains approximately constant; and during the period of propagation maintaining the yeast in the fermenter in an actively budding condition by increasing the addition of nutrients thereto at approximately the cessation of the budding period and the beginning of the ripening period; said increased addition being continued until the yeast again commences actively to bud, and thereafter reverting to the normal rate of addition until the beginning of the next cessation of budding.

5. An improved method of carrying out an addition process of manufacturing yeast, which comprises preparing a relatively concentrated yeast-nutrient solution, initiating the propagation of yeast in a dilute nutrient solution in a fermenter, aerating the propagating liquid, and adding thereto the relatively concentrated nutrient solution in a manner such that the density of the propagating liquid remains approximately constant; during the period of propagation maintaining the yeast in the fermenter in an actively budding condition by increasing the addition of nutrients thereto at approximately the cessation of the budding period and the beginning of the ripening period; said increased addition being continued until the yeast again commences actively to bud, thereafter reverting to the normal rate of addition until the beginning of the next cessation of budding; after the fermenter is substantially filled continuing the propagation as aforesaid while simultaneously withdrawing yeast-containing liquid from the fermenter at a rate substantially equal to the rate of addition of nutrients; leading the withdrawn yeast-containing liquid to an auxiliary fermenter, allowing it to accumulate therein for a period of about two hours, and thereafter withdrawing yeast-containing solution from the auxiliary fermenter to the separators at a rate substantially equal to the influx of the yeast-nutrient solution.

6. An improved method of conducting a continuous addition-continuous withdrawal process of manufacturing yeast, which comprises substantially filling a fermenter with dilute nutrient solution having substantially maximum yeast seeding, aerating the liquid, substantially continuously adding a more concentrated yeast-nutrient solution thereto, simultaneously withdrawing yeast-containing liquid therefrom at a rate approximately equivalent to the influx of yeast-nutrient solution, leading the withdrawn yeast-containing liquid to an auxiliary fermenter, aerating the liquid in the auxiliary fermenter while allowing it to accumulate for a period of about two hours, and then withdrawing yeast-containing solution from the auxiliary fermenter to the separators at a rate substantially equal to the influx of the yeast-nutrient solution.

In testimony whereof I affix my signature.

KAI ALEXANDER JACOBSEN.